March 16, 1965 R. J. EBBERT 3,173,554
CONVEYOR TRANSFER DEVICE
Filed Dec. 13, 1961 2 Sheets-Sheet 1
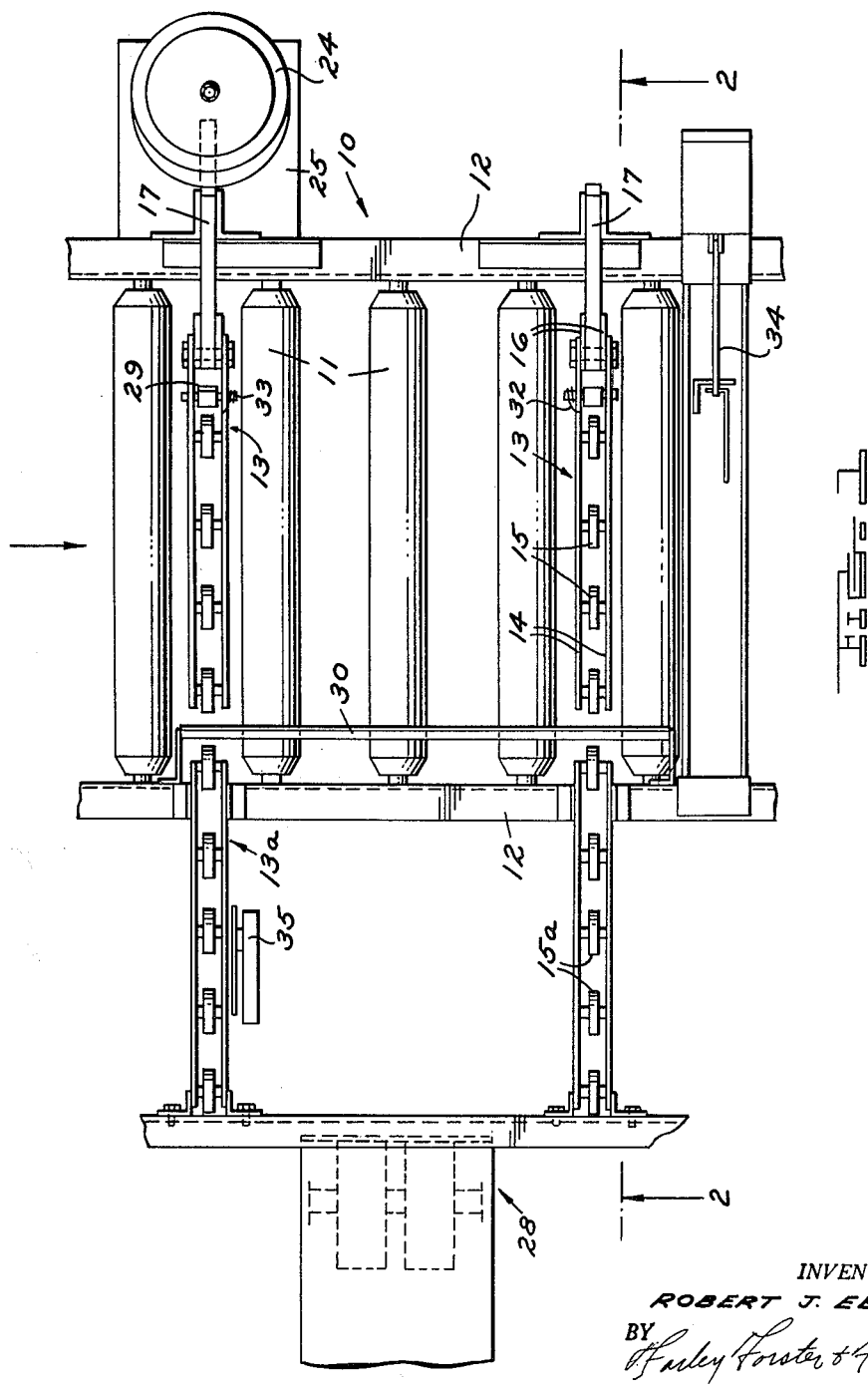
INVENTOR.
ROBERT J. EBBERT
BY
ATTORNEYS

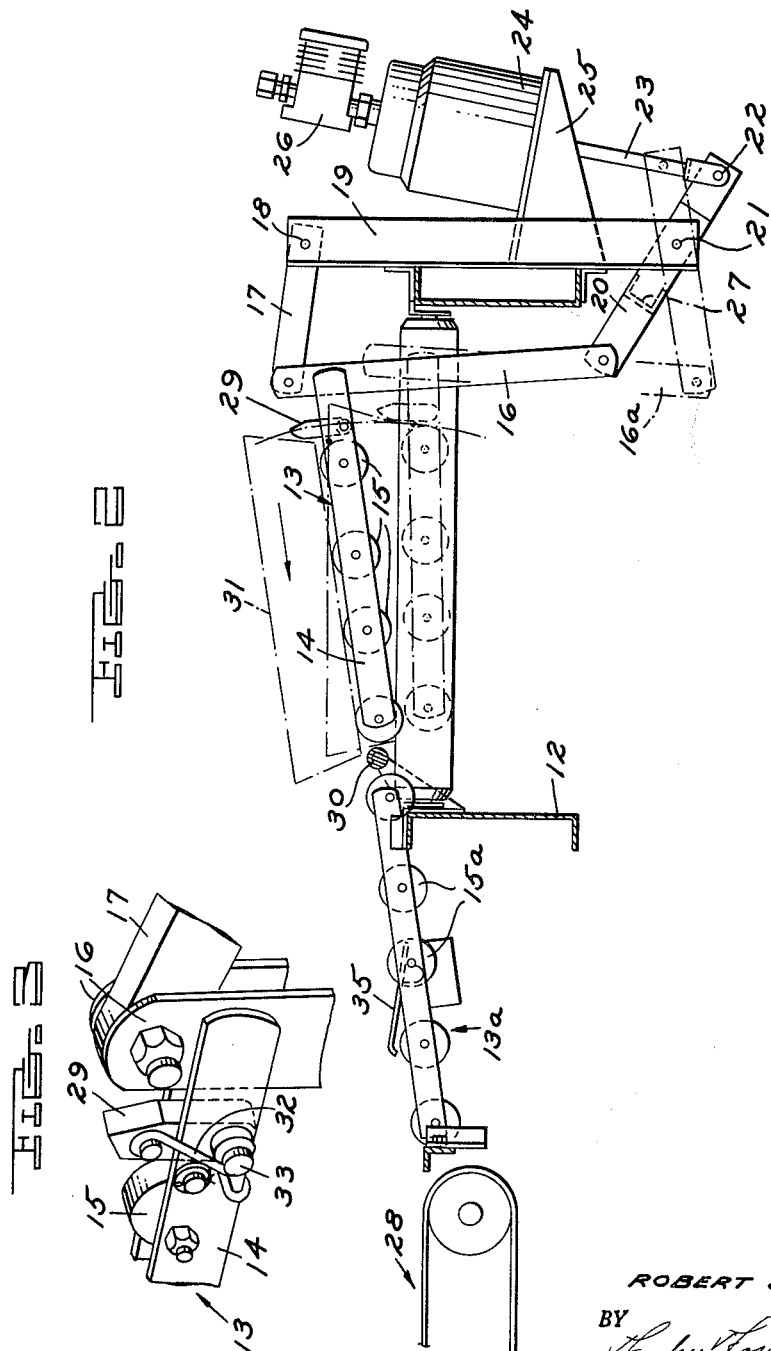

United States Patent Office 3,173,554
Patented Mar. 16, 1965

3,173,554
CONVEYOR TRANSFER DEVICE
Robert J. Ebbert, Rochester, Mich., assignor to Control Design and Fabricate, Incorporated, Farmington, Mich., a corporation of Michigan
Filed Dec. 13, 1961, Ser. No. 159,083
8 Claims. (Cl. 214—1)

This invention relates to a transfer device for use in diverting trays, boxes or similar articles or uniform size from a conveyor to a branch conveyor or the like.

Novel features of the device include a transfer mechanism capable of being raised to an angular discharge position with an article thereon and a spring-loaded kicker-dog unit cocked by the raising movement of the transfer mechanism adapted to accelerate the tray's movement in a lateral discharge direction down the inclined surface of the transfer mechanism and adjacent conveyor ramp.

It has been found that the rapid acceleration provided by the spring-loaded kicker unit greatly increases the speed of discharge operation as compared with reliance on gravity alone in similar discharge devices, permitting a higher operating speed for the conveyor from which the transfer is made. This and other objects will be more apparent from the following detailed description of a preferred embodiment of the invention with reference to the drawings wherein:

FIGURE 1 is a plan view of the transfer mechanism applied to a roller conveyor and ramp leading to a branch belt conveyor;

FIGURE 2 is a side elevation of the transfer mechanism shown in FIGURE 1; and

FIGURE 3 is an enlarged fragmentary isometric view of the spring-loaded kicker mechanism per se.

With reference to FIGURE 1 a conventional gravity or powered roller conveyor 10 having load supporting rolls 11, mounted on fixed channel supports 12, is provided at a typical transfer section with a pair of transfer arms 13, interposed in the normal spacing between adjacent rolls. Each arm comprises a pair of side bars 14, carrying a plurality of pivoted rollers 15, located below the load-bearing surface of the conveyor rolls 11 when the arms are in retracted position. The side bars 14 are welded at one end to a pair of vertical links 16 which are in turn pivotally connected at their upper and lower ends to an upper guide arm 17, pivotally connected at 18 at a stationary frame 19 and a lower actuating arm 20, pivotally connected at 21 to the stationary frame 19 and actuated at a pivotal connection 22 by piston rod 23, extending from an air cylinder 24, mounted on a stationary bracket 25, and controlled by a solenoid actuated valve 26. A cross-drive channel member 27 welded between the respective actuating arms 20, provides for simultaneous actuation of both transfer arms 13 by the single cylinder. The guide arms 17 and actuating arms 20 may be of substantially equal length as shown but are non-parallel due to the shorter spacing of the pivots on links 16 compared to pivots 18 and 21 which are in turn positioned to impart a rocking upward movement to the links 16 on actuation resulting in an angular alignment of the rollers 15 with corresponding rollers 15a on an inclined stationary ramp arms 13a leading to the surface of a branch line belt conveyor 28.

In addition to the rocking movement imparted to the links 16 their upper ends are caused by the angular relationship of the various pivotal connections to move in a lateral direction toward the branch conveyor 28 during upward actuation as may be seen by comparing the dotted line position 16a of the links in their retracted position with the full-line representation of such links in the transfer position. Such lateral movement is employed to load the pair of spring-actuated kicker-dogs 29 by foreshortening the spacing between such kicker-dogs and a stationary reaction bar 30, mounted on one of the conveyor channel supports 12 which spacing in the retracted position of the transfer arm is just sufficient to accommodate the width of tray 31.

As best shown in FIGURE 3, the kicker-dogs 29 are yieldably retained in a normal position by a torque spring 32 mounted on the kicker-dog pivotal connection 33. Thus, during the initial actuation of the transfer arms, the kicker-dogs 29 will become spring-loaded against the tray 31, interposed between the reaction bar 30 and kicker-dogs 29. As the transfer arms finally raise the rollers 15 above the effective level of the reaction bar 30 the adjacent lower edge of the tray is released and the spring-loaded kicker-dogs 29 rapidly accelerate the tray down the transfer ramp. A suitable stop mechanism 34 may be provided to interrupt the travel of a tray to be transferred on the main conveyor in response to any appropriate control system which may be readily adapted to this transfer mechanism to actuate the stop mechanism 34 and solenoid valve 26, and which may include a limit switch 35 adapted to restore the solenoid valve and transfer mechanism to its normal position in response to the passing of the tray after it leaves the transfer arm.

While a particular embodiment of the present transfer device has been shown and described in detail it will be understood that numerous modifications may be resorted to without departing from the scope of the invention as defined in the following claims.

I claim:

1. In combination a conveyor for transporting articles positioned on the upper surface thereof, a conveyor transfer device located at a transfer section of said conveyor, said transfer device including arm means adapted to raise an article above the upper surface of said conveyor, spring-actuated kicker means adapted to divert said article laterally off of said conveyor, and means responsive to raising of said arm means for loading said spring-actuated kicker means.

2. The combination set forth in claim 1 including means responsive to the raising of said arm means above a predetermined position for triggering said kicker-dog means to divert said article.

3. The combination set forth in claim 2 wherein the loading of said kicker-dog means places the article to be diverted in compression against the actuating surface of said kicker-dog means.

4. The combination set forth in claim 3 wherein a fixed stop is provided for engagement by a portion of the article while the kicker-dog means is being loaded.

5. The combination set forth in claim 4 wherein the raising of said arm means above the effective position of said fixed stop operates to trigger said kicker-dog mechanism.

6. The combination set forth in claim 5 including linkage for raising said arm means to an angular position relative to the load-bearing surface of said conveyor while simultaneously moving said kicker-dog mechanism towards said fixed stop thereby placing said article in compression therebetween.

7. The combination set forth in claim 6 wherein said linkage has the form of pivoted trapezoid elements.

8. In combination a roller conveyor having laterally extending longitudinally spaced rollers, a transfer mechanism positioned at a transfer section of said conveyor, said transfer mechanism including load engaging arm means normally extending beneath the load bearing surface of said conveyor and between said longitudinally spaced rollers, linkage for raising said load engaging arm means to an angular discharge position above the load bearing surface of said conveyor, a fixed inclined discharge ramp adjacent one side of said conveyor in alignment with the discharge position of said arm means, a longitudinally extending fixed reaction member extending above the load bearing surface of said conveyor, spring-actuated kicker-dog means on said arm means adapted to engage one side of an article on the conveyor and compress it against said fixed member while said arm means are being actuated to a raised discharge position, the final inclined discharge position of said arm means being above the effective article restraining level of said fixed reaction member.

References Cited in the file of this patent
UNITED STATES PATENTS

| | | |
|---|---|---|
| 1,804,153 | Cowley | May 5, 1931 |
| 1,904,837 | Posey | Apr. 18, 1933 |
| 3,017,007 | McGrath | Jan. 16, 1962 |